Jan. 19, 1960        J. BUCKNER        2,921,361
SPECTACLE FRAME MANUFACTURE
Filed April 8, 1957
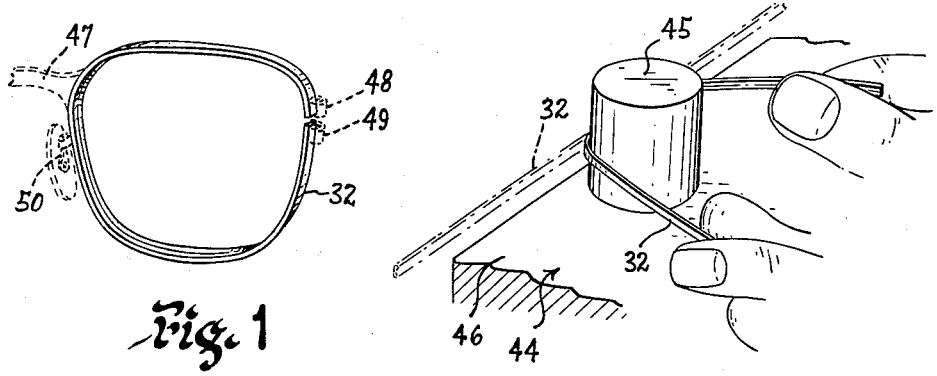
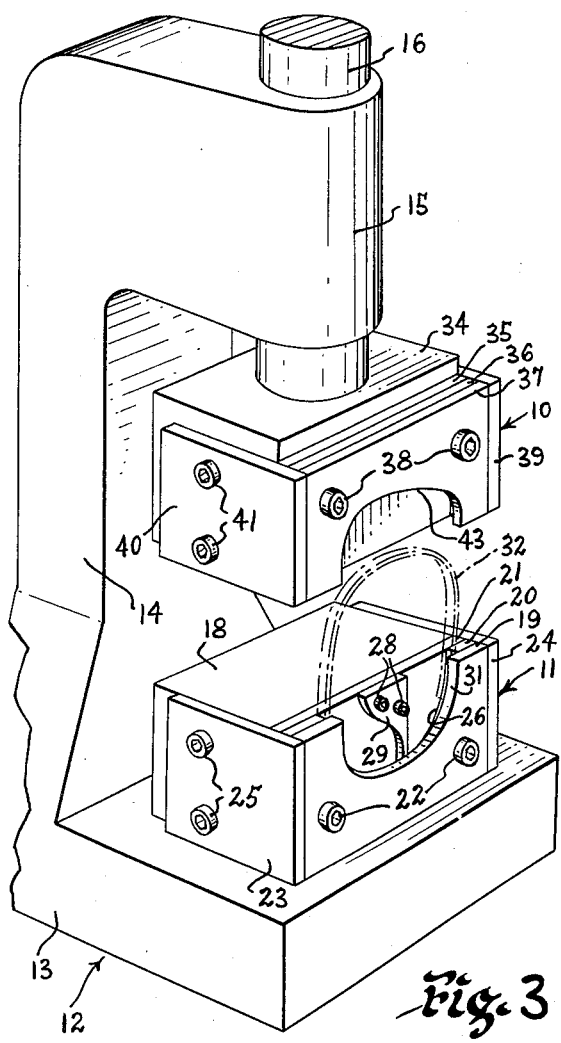
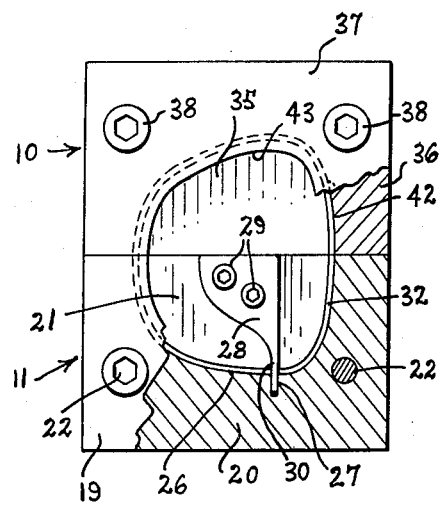
INVENTOR
JACK BUCKNER
BY
*Louis L. Gagnon*
ATTORNEY

United States Patent Office 2,921,361
Patented Jan. 19, 1960

2,921,361

SPECTACLE FRAME MANUFACTURE

Jack Buckner, Ozone Park, N.Y., assignor, by mesne assignments, to American Optical Company, Southbridge, Mass., a voluntary association of Massachusetts Application April 8, 1957, Serial No. 651,317

1 Claim. (Cl. 29—20)

This invention relates to improvements in machines for the manufacture of spectacle frames or the like and has particular reference to a novel and improved device for imparting the desired contour shape to the lens receiving portions thereof.

In the fabrication of spectacle frames or the like embodying lens encircling rims or eyewires, it is of extreme importance that said rims be shaped to the exact configuration and size of the lenses to be mounted therein. It is also important that the open or split ends of the eyewire be properly positioned in the desired contour of said eyewire and in proper relation to the other associated parts when the spectacle frame is completed.

If the eyewires of a spectacle frame are not shaped to the exact peripheral contour shape of the lenses to be mounted therein so as to snugly fit about the contour thereof the lenses will not be properly supported and will be more easily displaced and broken.

Another reason for desiring exact peripheral fit between the eyewires and the lenses is that when the eyewires are tightened about the lenses the binding force against the lenses will be evenly distributed about the periphery thereof and will not set up undue pressure at any particular point thereof at which point the lenses would be more easily broken. It is also desirable from a cosmetic viewpoint that the eyewires be closely fitted to the lenses so that there will be no spaces therebetween.

In the prior art methods of shaping the eyewires of a spectacle frame, such as winding a coil of wire on a shaped arbor or by bending a section of wire about a former, it was difficult to hold the shape and size to the close tolerances necessary as the wire not being set would tend to expand when the winding force was released. In the device of the present invention the wire, when formed to the desired shape, will be set and will sustain said shape due to the force applied thereto by the confined dies, thus providing more accurate control.

It is, therefore, the principal object of this invention to provide a device which will accurately shape the eyewires of a spectacle frame to the desired contour and size.

Another object of the invention is to provide a machine of simple construction in which the eyewires of a spectacle frame may be quickly and accurately shaped in an efficient and economical manner.

Other objects and advantages of the invention will become apparent from the following description taken in connection with the accompanying drawing in which:

Fig. 1 is a perspective view of a spectacle eyewire shaped to the desired contour through the use of the new device;

Fig. 2 is a perspective view of an eyewire blank being random bent for insertion in said device;

Fig. 3 is a perspective view of the device embodying the invention showing the dies separated and a random bent eyewire blank in position to be shaped; and Fig. 4 is a front elevational view of the dies in closed position with portions of the front plates broken away.

The device embodying the invention comprises broadly a pair of cooperating die assemblies 10 and 11 supported in a standard type sub-press 12. The sub-press 12 comprises a base 13 for supporting the die assembly 11, an upright portion 14 extending from the said base having a bearing 15 in spaced alignment with the base for supporting a sliding plunger 16 to which the die assembly 10 is attached.

It is to be understood that the sub-press is to be placed in any of the well known types of power or manually operated presses which are provided with suitable means for actuating the plunger 16 for moving one of the dies toward and away from the other.

The lower die assembly consists of a die block 18, which is secured to the base 13 by screws or the like (not shown), a cover plate 19, a forming plate 20 and a backing plate 21 which are secured to said block by the screws 22. A pair of end aligning plates 23 and 24 are also secured to the block by screws or the like 25.

The forming plate 20 which is shown as being positioned between the backing plate 21 and the cover plate 19, is provided with an upwardly facing cut-out forming portion 26 made to the size and shape desired of one half of the contour to be given to the eyewire blank. The forming plate 20 is also provided with a recess 27 in the cut-out portion 26.

The backing plate 21 is positioned between the forming plate 20 and the die block 18 and has secured thereto, by means of the screws 29 an indexing member 28 which is adapted to lie within the cut-out portion 26 of the forming plate 20.

The indexing member 28 is provided with an eyewire locating end portion 30, the end of which is adapted to seat within the recess 27 of the forming plate 20, as shown in Fig. 4 of the drawing. The end 30 of the indexing member 28 is thus positioned in the desired location relative to the contour shape of the forming plate 20 so that when the ends of the eyewire blank 32 are forced downwardly during the forming thereof they will be located at the desired point on the peripheral contour of the finished eyewire.

The cover plate 19 is provided with a cut-out portion 31 of a similar contour shape as the cut-out portion 26 of the forming plate 20, but of a smaller circumference so as to form an overhanging lip extending inwardly of the contour edge of the cutout portion 26 to provide means for confining the eyewire blank 32 therein when the plates are in assembled relation and the eyewire is being shaped.

The upper die assembly 10 which is carried by the sliding plunger 16 consists of a die block 34 secured to the said plunger in spaced alignment with the die block 18, a backing plate 35, an upper forming plate 36 and a cover plate 37 secured to the die block 34 by the screws 38 and a pair of end aligning plates 39 and 40 secured to the said block 34 by the screws 41.

The upper forming plate 36 which is shown as being positioned between the backing plate 35 and the cover plate 37 is provided with a downwardly facing cut-out forming portion 42 as best shown in Fig. 4, made to the size and shape desired of the opposed half of the contour to be given to the eyewire blank as that formed in the forming plate 20 of the lower die assembly 11 so that when the two die assemblies 10 and 11 are brought together the forming plates 20 and 36 will form the entire contour shape desired in the finished eyewire. It is to be understood that the forming plates 20 and 36 are supported in vertically aligned relation with each other.

The cover plate 37 is provided with a cut-out portion 43 of similar contour shape as the cut-out portion 42 of the forming plate 36 but of a smaller circumference so as to form an overhanging lip thereabout and thereby provide means whereby the eyewire blank may be confined therein while being shaped.

In using this device it is desirable to put a preliminary bend in the straight eyewire blank 32 so that it may be more easily placed within the cut-out portion of the lower forming plate 20. This bending may be done by hand but unless great care is taken the eyewire which is formed of a ductile material may form a sharp bend and will be apt to kink in the dies. It has been found that by the use of a simple fixture 44 such as shown in Fig. 2, that the wire may be quickly and easily pre-bent for insertion in the die.

The fixture 44 comprises a post 45 set into a bench or a bench block 46 about which the straight eyewire blank 32 may be bent as shown in Fig. 2.

After the straight eyewire blank 32 which has been cut to a specific length depending on the particular size eye to be formed thereof, has been pre-bent as shown in Fig. 2 it is ready for insertion within the die 11.

The pre-bent eyewire 32 is then placed in the lower die 11 with the ends thereof between the backing plate 21 and cover plate 19 and with the ends thereof against the walls of the cut-out forming portion 26 and will then be ready for final shaping.

The final shaping or forming of the eyewire blank is then accomplished by moving the upper die assembly 10 downwardly into contact with the lower die assembly 11 thereby forcing the eyewire blank 32 into intimate relation with the walls of the cut-out forming portions 26 and 42 of the plates 20 and 36 to assume the contour shape thereof. It will readily be seen that when the eyewire blank 32 is forced downwardly between the forming plates 20 and 36, that the ends thereof will be forced against the end 30 of the indexing member 28 and will thus be properly located at the desired point on the peripheral contour of the finished eyewire. This will insure that when the several other parts of a complete spectacle frame, such as the bridge 47, eyewire connecting lugs 48 and 49 and nose pad supporting arms 50, are secured to the eyewire, that the ends of the eyewire will be properly positioned in desired relation thereto.

From the foregoing description taken in connection with the accompanying drawing it will be seen that simple, efficient and economical means have been provided for accomplishing all the objects and advantages of the invention. However, it will be seen that many changes may be made in the arrangement of parts and details of construction shown and described without departing from the spirit of the invention as expressed in the accompanying claim. Therefore, it is to be understood that all matter set forth or shown in the drawing is to be interpreted as illustrative and not in a limiting sense.

Having described my invention I claim:

A shaping device of the character described for shaping a single piece of metal bar stock into the shape of an eyewire for an ophthalmic mounting comprising die members supported in aligned relation with each other and for movement of one of said die members toward and away from another of said die members, each of said die members comprising a backing plate, said backing plates having relatively straight edge portions adapted to meet in engaging relation with each other, a shaping plate secured in superimposed relation with each of said backing plates and each having a cut-out portion in facing relation with each other and of the desired contour shape to be applied to the bar stock, one of said shaping plates having a recess therein in communicating relation with the cut-out portion of said plate, a cover plate secured in superimposed relation with each of the shaping plates and each having an edge portion of substantially the same shape and extending slightly outwardly beyond said cut-out portions of said shaping plates to form channels for receiving an initially substantially circularly bent section of said bar stock and an indexing member having a portion secured to the side surface of the backing plate and having an integral reduced portion extending transversely of said channel of said shaping plate and into said recess in closely fitting relation therewith, said reduced portion being adapted to be engaged by the ends of said bar section during movement of said die members toward each other in the shaping of said bar section to the desired eyewire shape and to locate the portion of said bar section intermediate its ends in proper correlation with the channels of said cut-out portions.

References Cited in the file of this patent

UNITED STATES PATENTS

| 9,278 | Prosser | Sept. 21, 1852 |
| 1,406,053 | Maynard | Feb. 7, 1922 |
| 1,872,276 | Graham | Aug. 16, 1932 |
| 2,696,858 | Johnston | Aug. 14, 1952 |

FOREIGN PATENTS

| 201,470 | Australia | Mar. 19, 1956 |